United States Patent
Garg et al.

(10) Patent No.: US 7,970,868 B2
(45) Date of Patent: Jun. 28, 2011

(54) CUSTOMIZABLE, SMART-TAG BASED CONTENT DELIVERY AND NOTIFICATION SYSTEM, PROGRAM, AND METHOD FOR CONNECTING ENTITIES ON THE WORLD WIDE WEB

(76) Inventors: Rakesh Garg, Milpitas, CA (US); Amitabh Sinha, Fremont, CA (US)

( * ) Notice: Subject to any disclaimer, the term of this patent is extended or adjusted under 35 U.S.C. 154(b) by 230 days.

(21) Appl. No.: 12/105,465

(22) Filed: Apr. 18, 2008

(65) Prior Publication Data
US 2008/0270538 A1    Oct. 30, 2008

Related U.S. Application Data

(60) Provisional application No. 60/914,307, filed on Apr. 26, 2007.

(51) Int. Cl.
*G06F 15/16* (2006.01)
(52) U.S. Cl. ......................... 709/219; 709/206
(58) Field of Classification Search .................. 709/203, 709/217, 219, 227
See application file for complete search history.

(56) References Cited

U.S. PATENT DOCUMENTS

| | | | |
|---|---|---|---|
| 6,009,410 A | 12/1999 | LeMole | |
| 6,460,036 B1 | 10/2002 | Herz | |
| 7,039,599 B2 | 5/2006 | Merriman et al. | |
| 7,076,444 B1 | 7/2006 | Baron et al. | |
| 7,133,901 B1 | 11/2006 | Dalby et al. | |
| 2002/0026357 A1 | 2/2002 | Miller | |
| 2005/0086119 A1 | 4/2005 | Komuro et al. | |
| 2005/0097008 A1 | 5/2005 | Ehring et al. | |
| 2005/0222903 A1 | 10/2005 | Buchheit et al. | |
| 2006/0004703 A1 | 1/2006 | Spivack et al. | |
| 2006/0010036 A1 | 1/2006 | Burry | |
| 2006/0085318 A1 | 4/2006 | Cohoon | |
| 2006/0100923 A1 | 5/2006 | Courchesne | |
| 2006/0149677 A1 | 7/2006 | Shahine et al. | |
| 2006/0156283 A1 | 7/2006 | Landau et al. | |
| 2006/0253326 A1 | 11/2006 | Patterson et al. | |
| 2006/0265462 A1 | 11/2006 | Stark et al. | |
| 2007/0157231 A1* | 7/2007 | Eldering et al. ................. | 725/35 |
| 2008/0109481 A1* | 5/2008 | Catanzariti et al. ........ | 707/104.1 |

* cited by examiner

*Primary Examiner* — Ian N Moore
*Assistant Examiner* — Afshawn Towfighi
(74) *Attorney, Agent, or Firm* — Ariel S. Bentolila; Bay Area IP Group, llc

(57) ABSTRACT

A method for delivering content to users from a web site system over a network is presented. The method includes one or more users connecting to the web site system over the network for the purpose of registering as a sending party to provide content to the web site system along with providing one or more smart-tags associated with the content, the smart-tags providing qualifying information about the content, or registering as a subscribing party to request content from the web site system by providing a subscription including one or more smart-tags. The sending party requests the web site system to deliver content provided by the sending party and the subscribing party requests delivery of the desired content. The subscribing party receives the desired content from the web site system over the network when the subscription at least in part matches one or more smart-tags provided by the sending party.

41 Claims, 10 Drawing Sheets

500

ACCOUNT INFORMATION

Required fieldsare marked with an asterisk *                                    502

* User Id: [    ]
* Password: [    ]          * Re-type Password: [    ]
* Email: [    ]             * Re-type Email: [    ]

PERSONAL INFORMATION

First name: [    ]          Last name: [    ]
Address 1: [    ]           Address 2: [    ]           504
City: [    ]                Zipcode: [    ]
State: [    ]               Country: [    ]
Notifcation Email: [    ]   Re-type Notifcation Email: [    ]
SMS Notifcation Number: [    ]   Re-type SMS Notifcation Number: [    ]

ORGANIZATIONAL INFORMATION

■ Organization — 510
                                                                              506
*Organization Name: [    ]          Website: [    ]

*Organization Category:
[Restaurant ▼]
  Restaurant
  Automative
  Clothing
  Sports
512

*Subcategories:
[■ Italian
 ■ Northern
 ■ Central
 ■ Southern
 ■ Dine-in Only
 ■ Chinese]
514

*Address 1: [    ]          *Address 2: [    ]
*City: [    ]               *Zipcode: [    ]
*State: [    ]              *Country: [    ]
*Phone: [    ]              Fax: [    ]

508                         516
Submit                      Cancel

POST CONTENT TO SEND

690

Required fields are marked with an asterisk *

608

Subject: [Lunch Buffet Promotion]   Disclaimer: [Coupon good for one person only. No cash value.]

604

Description: [Lunch buffet promotion on all pasta items.]

606

610

[C:\coupon.jpg]

TAG CONTENT TO SEND

692

*Category: 612    Subcategories: 614

[Restaurant]
[Restaurant
Automative
Clothing
Sports]

[■ Italian
  ■ Northern
  ■ Central
  ■ Southern
■ Dine-in Only
■ Chinese]

616

618

BUSINESS INTELLIGENCE

694

| Number of currently matching subscriptions: | 20 | 632 |
| Potential number of SMS recipients: | 7 | 634 |
| Potential number of Email recipients: | 6 | 636 |
| Number of currently matching subscriptions if end date is moved out by 3 days: | 30 | 638 |
| Potential number of SMS recipients: | 11 | 640 |
| Potential number of Email recipients: | 12 | 642 |

644

Enter    676    Cancel

| SMART-TAG EDITOR FORM |
|---|

SMART-TAG EDITOR — 702

| Tag Name | Tag Value |
|---|---|

724 — 726

*SYSTEM DEFINED TAGS* — 704

| ■ Promotion | ■ Lunch<br>■ Dinner<br>■ All Day | |
|---|---|---|
| ■ Discount | 10 % | |

712, 714 — 706

728

*AVAILABLE CUSTOM TAGS*

| ■ Meat Dishes | Excluded | |
|---|---|---|
| | | |

730, 732 — 708

*ADD CUSTOM TAGS*

| Alcohol I | Excluded I | |
|---|---|---|
| | | |

716, 718, 720 — 710, 722

748  746
Enter  Cancel

| SCHEDULING EDITOR FORM |
|---|

— 750

| | 760 | | 762 | | 764 | |
|---|---|---|---|---|---|---|
| *Start Date: | 03/03/2007 | *End Date: | 03/07/2007 | *Start Delivering On: | 03/01/2007 | |
| ■ Mon | *Valid Between: | 1:00 PM – 2:30 PM | | *Start Delivering At: | 12:30 PM | |
| ■ Tue | *Valid Between: | 12:00 PM – 2:30 PM | | *Start Delivering At: | 12:00 PM | |
| ■ Wed | *Valid Between: | 1:30 PM – 2:30 PM | | *Start Delivering At: | 11:30 PM | |
| ■ Thu | *Valid Between: | 2:00 PM – 2:00 PM | | *Start Delivering At: | 12:30 PM | |
| ■ Fri | *Valid Between: | 11:00 PM – 2:30 PM | | *Start Delivering At: | 1:30 PM | |
| ■ Sat | *Valid Between: | 1:00 PM – 2:30 PM | | *Start Delivering At: | 12:30 PM | |
| ■ Sun | *Valid Between: | 1:00 PM – 2:30 PM | | *Start Delivering At: | 12:30 PM | |

754  756  758

Enter — 752       Cancel — 766

800

DESCRIBE CONTENT TO RECEIVE USING SMART TAGS  810

*Category: 812    Subcategories: 814

Restaurant
- Restaurant
- Automative
- Clothing
- Sports

- Italian
  - Northern
  - Central
  - Southern
- Dine-in Only
- Chinese

816

SCHEDULE CONTENT TO RECEIVE  830

832 *Start Date: 03/03/2007    834 *End Date: 03/07/2007

BUSINESS INTELLIGENCE  850

Count of currently matching content: 20  852

Number of currently matching subscriptions if end date is moved out by 3 days: 35  854

856

NOTIFICATION PREFERENCES  870

872 Notifcation Email: ____    SMS Notifcation Number: ____
874

Enter  876    Cancel

*FIG. 8*

CUSTOMIZABLE, SMART-TAG BASED CONTENT DELIVERY AND NOTIFICATION SYSTEM, PROGRAM, AND METHOD FOR CONNECTING ENTITIES ON THE WORLD WIDE WEB

CROSS-REFERENCE TO RELATED APPLICATIONS

The present Utility patent application claims priority benefit of the U.S. provisional application for patent Ser. No. 60/914,307 filed on Apr. 26, 2007 under 35 U.S.C. 119(e). The contents of this related provisional application are incorporated herein by reference for all purposes.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to communication through the Internet. More particularly, the invention relates to a Web-based system employing smart-tags for facilitating commercial and non-commercial transactions and communications between interested parties.

BACKGROUND OF THE INVENTION

Small neighborhood-businesses catering to local business needs typically get most of their revenue from a repeat clientele. Some small businesses also offer products and services that can be sold to consumers beyond the local boundaries. Small businesses use a variety of means to advertise to their potential customer base; however, because of limited advertising budgets and lack of brand awareness, most of these means are ineffective in marketing the products and services to the target audience.

Most small businesses advertise their presence in one or more printed yellow pages directories. These businesses also advertise their products and services by sending coupons, promotions, and other business related content via newspapers, and miscellaneous local publications. Most of these advertising materials are usually treated as junk mail by consumers. As a result, such advertising is largely ignored by consumers, including advertising that may actually be of interest to them.

Many small businesses are turning to the Internet to reach consumers. Many small businesses have been advertising their presence in one or more online yellow pages websites and are also accessible via internet search engines. Many small businesses also maintain websites providing information that is relevant to promoting their business. However, online marketing poses significant challenges for these small businesses. One of the primary challenges faced is that their websites are relatively unknown to consumers and as a result do not attract enough visits by existing or potential customers. The registered user base if any for these websites is minimal as most consumers are reluctant to provide email addresses or other contact information for the purposes of receiving promotional or informational communications from vendors. Also, these small businesses typically lack the technical expertise to make changes to their websites on an ongoing basis. As a result, these websites tend to maintain minimal functionality primarily limited to displaying content that does not change frequently, content such as, but not limited to, addresses, hours of operations, menus, and media reviews. Promotions or communications that need to be sent out or posted frequently are typically not reflected on the website. With such rudimentary websites, it is difficult for these small businesses and consumers to communicate intelligently and effectively via websites for the purposes of mutually beneficial business transactions.

To send online content such as, but not limited to, advertisements, promotions, and general notifications, the sending party, for example, without limitation, a commercial or a non-commercial entity, requires the email address of the receiving party. This email address is typically provided by the receiving party during registration on the website of the sending party. This approach of sending and receiving content has numerous drawbacks for both the parties. The receiving party is forced to divulge personal information such as, but not limited to, an email address and cannot maintain anonymity. If the receiving party is interested in receiving such content from multiple sending parties, the receiving party must independently register on the website of each sending party. As a result, the receiving party has to track and maintain these multiple registered accounts. Furthermore, once registered, the receiving party typically receives all content from the sending party, whether of relevance or not to the interests of the receiving party. There is no good way for the receiving party to specifically describe or limit the type of content that the receiving party is interested in receiving from the sending party. The receiving party is forced to receive all content sent out by the sending party. The content is received primarily in the form of electronic mail (email) and the receiving party must spend time and effort to read the email and ascertain whether the content is of any relevance to their needs.

As for the drawbacks for the sending party, the sending party is required to maintain at least a current email address of recipients. If this email address becomes invalid and the recipients do not update registration information with the sending party, the sending party is not able to deliver the content to the recipients. Furthermore, the sending party uses the subject line of the email to identify the nature of the content being delivered via the email. The subject line may be somewhat indicative of the email content. However, this indication is primarily of a general nature in free form text, and typically not very specific. Thus the sending parties have no way of externally tagging their content, with intelligent information or qualifying descriptors that would help the receiving party quickly and accurately identify the nature of the email content.

The large and medium sized businesses with brand name awareness also face the aforementioned constraints when it comes to online advertising. Other entities facing these challenges associated with reaching audiences via online means include various commercial and non-commercial entities such as, but not limited to, individual owned businesses, apartment complexes, city governments, police departments, and religious bodies.

In view of the foregoing, there is a need for an improved method of communication between parties over the Internet that enables the receiving party to receive only communications that are of interest to him. There is also a need for a Web-based form of communication between parties that does not require the sending party to continually update contact information and does not require the receiving party to register with every entity for which he wishes to receive information.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 illustrates an exemplary screen shot of a registration form used to enable sending parties and subscribers to register with the web site system, in accordance with an embodiment of the present invention;

FIG. 6 illustrates a screen shot of an exemplary content form used by a sending party to post content, in accordance with an embodiment of the present invention;

FIG. 7 illustrates an exemplary screen shot of a smart-tag editor and a scheduling editor used by the web site system, in accordance with an embodiment of the present invention;

FIG. 8 illustrates a screen shot of an exemplary notification form used by a subscriber to specify content the subscriber is interested in receiving, in accordance with an embodiment of the present invention;

Figure 1:
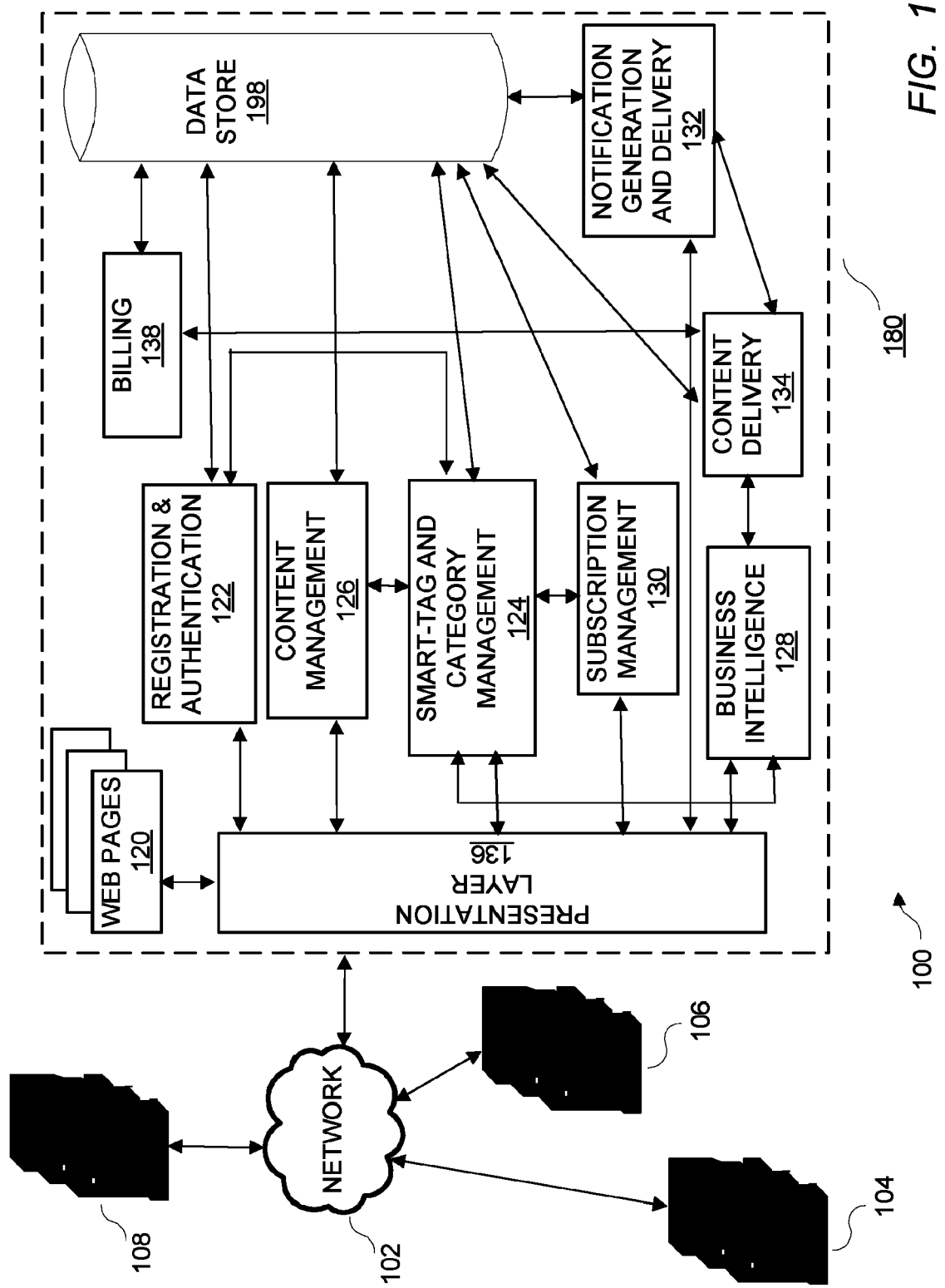
FIG. 1 is a schematic block diagram illustrating a computer network employing an exemplary web site system, in accordance with an embodiment of the present invention.

Unless otherwise indicated illustrations in the figures are not necessarily drawn to scale.

SUMMARY OF THE INVENTION

To achieve the forgoing and other objects and in accordance with the purpose of the invention, a customizable, smart-tag based content delivery and notification system, program, and method for connecting entities on the World Wide Web is presented.

In one embodiment, a method for delivering content to users from a web site system over a network is presented. The method includes one or more users connecting to the web site system over the network for the purpose of registering as a sending party to provide content to the web site system along with providing one or more smart-tags associated with the content, the smart-tags providing qualifying information about the content, or registering as a subscribing party to request content from the web site system by providing a subscription including one or more smart-tags, the smart-tags providing qualifying information about desired content to be received. The sending party requests the web site system to deliver content provided by the sending party. The subscribing party requests delivery of the desired content. And, the subscribing party receives the desired content from the web site system over the network when the subscription at least in part matches one or more smart-tags provided by the sending party. Further embodiments include the one or more users providing the qualifying information for identifying categories and category hierarchy to which the content belongs, the one or more users providing the smart-tags by selecting a predefined tag name and assigning the tag name a value and the one or more users providing the smart-tags by creating a custom tag name and assigning the custom tag name a value. In another embodiment, during the sending party providing content and one or more smart-tags to the web site system, the sending party receiving first business intelligence information from the web site system regarding a number of subscriptions matching the one or more smart-tags provided by the sending party. In another embodiment, the first business intelligence information received by the sending party further includes one or more alternative smart-tags and a potential number of matching subscriptions to the alternative smart-tags. In a further embodiment, after the sending party requests the web site system to deliver content, the sending party receiving second business intelligence information from the web site system regarding a number of matched subscriptions to the one or more smart-tags provided by the sending party and a number of subscribing parties that have received desired content provided by the sending party. Other embodiments includes during the subscription party providing the subscription, the subscription party receiving subscriber business intelligence information from the web site system regarding a number of content matching the subscription and the subscriber business intelligence information received by the subscriber further includes one or more alternative smart-tags and a potential number of matching content to the alternative smart-tags. Other embodiment provide for the sending party providing account information for the purpose of restricting access to modify content, smart-tags and other information provided by the sending party, the sending party providing billing information for the purpose of receiving billing for services provided by the web site system, the sending party providing notification information for the purpose of receiving notifications from the web site system and the sending party requesting notification of the number of matched subscriptions reaching a determined value and the sending party receiving the notification. A further embodiment includes the sending party providing time period information for the purpose of determining when content provided by the sending party can be received by the subscribing party from the web site system. Further embodiments include the subscribing party providing account information for the purpose of restricting access to modify smart-tags and other information provided by the sending party, the subscribing party providing billing information for the purpose of receiving billing for services provided by the web site system and the subscribing party providing notification information for the purpose of receiving notifications from the web site system. In yet another embodiment, the subscribing party provides time period information for the purpose of determining when desired content can be received by the subscribing party. In another embodiment, the subscribing party provides purchase information for the purpose of purchasing an item or service when desired content is for a sale of the item or service. Another embodiment includes the subscribing party receiving notification from the web site system when desired content is available for delivery. In yet another embodiment, when the sending party receives the second business intelligence information from the web site system, the second business intelligence information further includes a number of notifications, of sender's content being available for delivery, are delivered to subscribing parties. In still other embodiments, one or more users browse content on the web site system using a search criteria and one or more users browse content on the web site system using an existing smart-tag to qualify the search criteria.

In another embodiment a method for delivering content to users from a web site system over a network is presented. The method includes steps for one or more users to connect to the web site system over the network for the purpose of registering as a sending party or a subscribing party, steps for sending party to provide content to the web site system along with providing one or more smart-tags associated with the content, steps for the subscribing party to request desired content from the web site system by providing a subscription including one or more smart-tags, steps for the sending party to request the web site system to deliver content, steps for the subscribing party to request delivery of the desired content and steps for the subscribing party to receive the desired content from the web site system over the network. A further embodiment includes, during the sending party providing content and one or more smart-tags to the web site system, steps for the sending party receiving first business intelligence information from the web site system. Another embodiment includes after the sending party requests the web site system to deliver content, steps for the sending party receiving second business intelligence information from the web site system. Another embodiment includes during the subscription party providing the subscription, steps for the subscription party receiving subscriber business intelligence information from the web site system. Other embodiments further include steps for the sending party providing account, steps for the sending party providing billing information and steps for the sending party providing notification information. Yet another embodiment includes steps for the sending party requesting notification of the number of matched subscriptions reaching a determined value. Another embodiment includes steps for the sending party providing time period information. Further embodiments include steps for the subscribing party providing account information, steps for the subscribing party providing billing information, steps for the subscribing party providing notification information, steps for the subscribing party providing time period information and steps for the subscribing party providing purchase information. Another embodiment includes steps for the subscribing party receiving notification from the web site system when desired content is available for delivery. Another embodiment includes steps for one or more users to browse content on the web site system using search criteria.

In another embodiment a method for delivering content to users from a web site system over a network is presented. The method includes means for one or more users to connect to the web site system over the network for the purpose of registering as a sending party or a subscribing party, means for the sending party to provide content to the web site system along with providing one or more smart-tags associated with the content, means for the subscribing party to request desired content from the web site system by providing a subscription including one or more smart-tags, means for the sending party to receive a business intelligence information from the web site system, means for the subscription party to receive a subscriber business intelligence information from the web site system, means for the sending party to request the web site system to deliver content, means for the subscribing party to request delivery of the desired content, means for the sending party to receive notifications from the web site system, means for the subscribing party to receive notifications from the web site system and means for the subscribing party to receive the desired content from the web site system over the network. Another embodiment includes means for the subscribing party to purchase goods or services from the sending party. Yet another embodiment includes means for one or more users to browse content on the web site system.

In another embodiment a system for delivering content to users from a web site system over a network is presented. The system includes a presentation layer for receiving and sending information to users, a registration and authentication module for registering and confirming identities of users of the system, a content management module for managing creation, access, and updates of content delivery requests from users registered as sending parties requesting to send content, a smart-tag management module handling functionality related to creating, updating, and accessing smart-tags associated with the content, the smart-tags including a tag name and a value assigned to the tag name where one or more smart-tags are associated to the content by the sending party, a subscription management module managing creation, access, and updates of subscriptions from users registered as subscribing parties requesting to receive desired content, the subscriptions including one or more smart-tags, a data store for storing at least content and the smart-tags, a content delivery module using an algorithm for matching content to the subscriptions using the smart-tags and a notification generation and delivery module for delivering content that matches subscriptions to the respective subscribing parties where content from the sending party is delivered and the web site system provides anonymity to the subscribing party. In a further embodiment, the notification generation and delivery module further includes means for notifying subscribing parties of content matching the subscriptions. Other embodiments further include a business intelligence module for providing information to the sending parties regarding matching subscriptions and the business intelligence module further provides information to the subscribing parties regarding matching content. Yet another embodiment includes a billing module for billing sending parties or subscribing parties for services provided by the web site system. Still another embodiment includes web pages for use by the presentation layer.

In another embodiment a computer program product for delivering content to users from a web site system over a network is presented. The product includes computer program code for one or more users to connect to the web site system over the network for the purpose of registering as a sending party or a subscribing party, computer program code for the sending party to provide content to the web site system along with providing one or more smart-tags associated with the content, computer program code for the subscribing party to request desired content from the web site system by providing a subscription including one or more smart-tags, computer program code for the sending party to receive a business intelligence information from the web site system, computer program code for the subscription party to receive a subscriber business intelligence information from the web site system, computer program code for the sending party to request the web site system to deliver content, computer program code for the subscribing party to request delivery of the desired content, computer program code for the sending party to receive notifications from the web site system, computer program code for the subscribing party to receive notifications from the web site system and computer program code for the subscribing party to receive the desired content from the web site system over the network. In still another embodiment, the computer program product resides on a computer-readable medium.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognized a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternatives embodiments do not necessarily imply that the two are mutually exclusive.

The present invention will now be described in detail with reference to embodiments thereof as illustrated in the accompanying drawings.

Some aspects of the present invention described below provide smart-tag based content delivery and notification systems for connecting individuals, commercial entities, and non-commercial entities on the Internet. The preferred embodiment is a smart-tag based content delivery system that accurately delivers relevant content and information between interested parties. The system is implemented as a Website portal accessible by potential users with access to the Internet. The sending or publishing parties describe or upload content to be sent out on the portal and use smart-tags to provide additional qualifying information about that content. The subscribing parties create subscription requests to receive desired content and qualify their subscriptions using smart-tags. The content subscribed to by subscribing parties may not be immediately available at the time the subscription is created, and may possibly become available in the future. In the preferred embodiment, the system continuously monitors the published content and the existing subscriptions for matches based on the qualifying information contained in the smart-tags. When a match occurs based on the smart-tags between published content and one or more subscriptions, the system delivers the content to the appropriate subscribers for viewing on the portal. In the preferred embodiment, the subscribers may also opt to be notified via additional channels such as, but not limited to, electronic mail (email), SMS (Short Message Service), instant message, fax, or pager. The sending and receiving parties may optionally be charged a small fee for the service.

Embodiments of the present invention enable subscribers to receive content from commercial and non-commercial entities without having to explicitly register with these entities on their respective web sites or divulging any personal information. Subscribers can choose to receive all content related to a specific category and subcategories. Subscribers may also choose to receive specific content from a specific commercial entity or a non-commercial entity. Sending parties, which may comprise commercial, non-commercial, individual businesses or individual users, can send content without knowing or having to maintain the email addresses or any identification information about the subscribers. Sending parties can communicate the precise nature of the content being sent by using system defined and custom smart-tags. The system also provides information to the sending parties about the potential number of matching subscription requests that may exist at the time the content is created for delivery. This information gives the sending parties the option of modifying their content delivery request and potentially increasing the number of matching subscription requests for their content. The system also provides information to the sending party about the number of recipients who have received the content via email or SMS and also about the number of recipients who have viewed the content on the system portal. Embodiments of the present invention can be used for communication functions such as, but not limited to, business-to-business (B2B), business-to-consumer (B2C), and consumer-to-consumer (C2C) transactions for commercial or non-commercial purposes.

As used herein, the terms sending party and subscriber are intended to broadly encompass individuals, individual owned businesses, small, medium, or large commercial and non-commercial entities and the like. As an example only and not by way of limitation, sending parties and subscribers could be government bodies such as, but not limited to, city government, police departments, or other entities such as, but not limited to, nonprofits, neighborhood businesses, residential apartment complexes, religious organizations, churches, temples, individual owned businesses, or service providers such as, but not limited to, electricians, plumbers, and dentists.

As used herein, the term content is intended to broadly encompass any digital content that can be delivered on the Internet, for example, without limitation, a piece of text, graphical images, video, audio, or any combination thereof. As an example only and not by way of limitation, this content may include, without limitation, postings seeking or selling any products or services, promotions, coupons, newsletters, brochures, advertisements, any type of alert reminders, any files containing audio or video data streams, or any type of notifications between entities.

FIG. 1 is a schematic block diagram illustrating a computer network 102 employing an exemplary web site system 100, in accordance with an embodiment of the present invention. In the present embodiment, web site system 100 is a customizable, smart-tag based content delivery and notification system for connecting individuals, commercial entities, and non-commercial entities on the Internet.

Web site system 100 is architected to operate on web pages in a computer network 102 such as, but not limited to, the Internet, an intranet, or an extranet. In the present embodiment, web site system 100 comprises one or more client workstations 104, one or more client workstations 106, one or more web site owner client workstations 108, a web server 180, all connected to one another through network 102. Network 102 may be any network such as, but not limited to, a local area network (LAN), a wide area network, intranet, extranet, Internet, or any other suitable network. The computer systems associated with client workstation 104, client workstation 106, web site owner client workstation 108, and web server 180 include, but are not limited to, input devices, output devices, processors, memories, and other components suitable for the features and operations described below. In the present embodiment, client workstations 104 are operated by subscribers, and client workstations 106 are operated by sending parties.

In general, the subscriber user of client machine 104 or the sending party user of client machine 106 may use a web browser or any software component capable of exchanging information with a web server, to establish a connection with web server 180 by specifying an electronic address such as, but not limited to a uniform resource locator (URL). Once the connection is established, web server 180 communicates one or more web pages 120 to client workstation 104 or client workstation 106. System web page 120 is generated by a web server, such as, but not limited to, web server 180. Web server 180 can be accessed from any web browser or software component capable of exchanging information with a web server.

In the present embodiment, web server 180 comprises one or more web pages 120, a presentation layer 136, a user registration and authentication module 122, a content management module 126, a smart-tag and category management module 124, a subscription management module 130, a business intelligence module 128, a content delivery module 134, a billing module 138, a notification generation and delivery module 132, and a data store 198. Web pages 120 represent the various web pages that a web browser on client workstation 104 or client workstation 106 receives from web server 180. Presentation layer 136 processes all requests from a web browser on client workstation 104 or client workstation 106 into web server 180 and forwards all responses from web server 180 to the browser on client workstation 104 or client workstation 106. Registration and authentication module 122 provides functionality to register a new user and authenticate all user logins into web site system 100. Smart-tag management module 124 handles all functionality related to creating, updating, and accessing all smart-tags. Content management module 126 manages the creation, access, and updates of content delivery requests from the sending party. The subscription management module 130 manages the creation, access, and updates of all subscriptions from the subscriber. Business intelligence module 128 provides information to the sending party on how to maximize the reach of their content on web pages 120. Business intelligence module 128 also provides useful insight to the subscribers on how to increase the scope of their subscription request to get the maximum amount of relevant content. Billing module 138 supports functionality for sending parties who use fee based services provided by web site system 100. For example, and without limitation, in some embodiments the sending parties could be charged a fee for creating a content delivery request and subscribing parties could be charged a fee for creating subscription requests. Content delivery module 134 provides the business logic used to match content being sent in response to subscription requests. Notification generation and delivery module 132 delivers the content that matches a subscription request to the respective subscribers and also notifies the subscribers based on the subscriber's notification preferences. Data store 198 represents persistent computer storage such as, but not limited to, a database or a file system.

Figure 2:
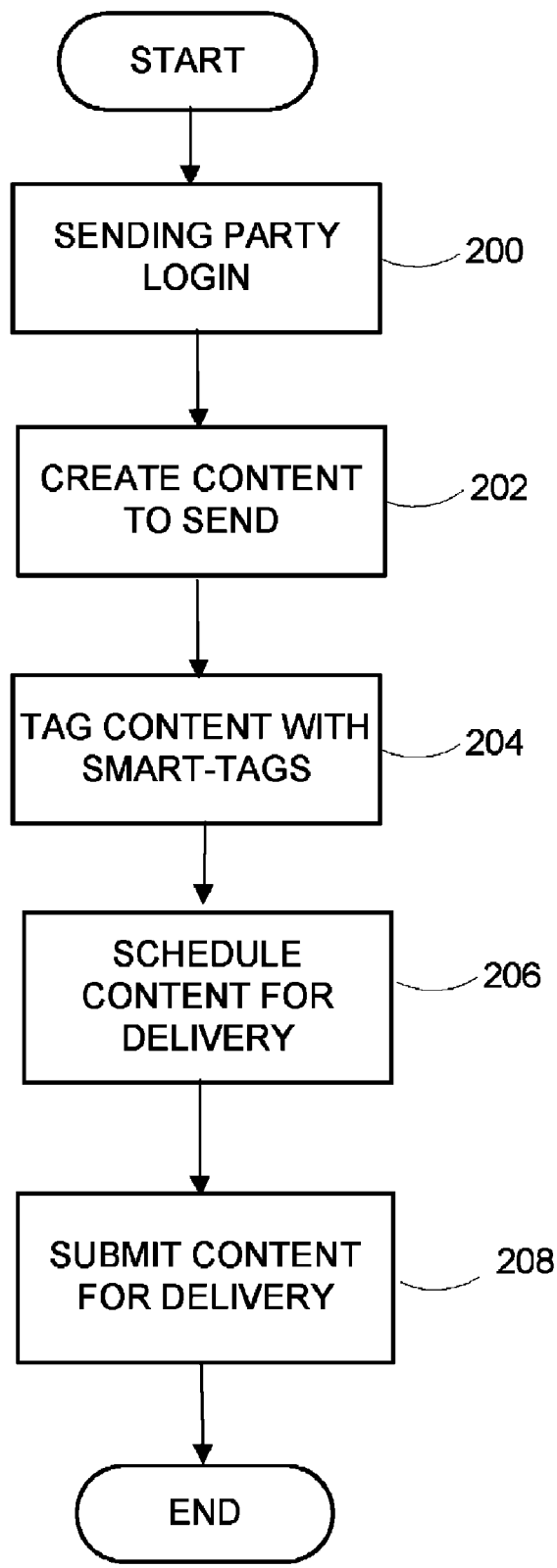
FIG. 2 is a flow chart illustrating an exemplary process of creation of a content delivery request by a sending party, in accordance with an embodiment of the present invention.

FIG. 2 is a flow chart illustrating an exemplary process of creation of a content delivery request by a sending party, in accordance with an embodiment of the present invention. The sending party starts by initially logging in into web site system 100, shown by way of example in FIG. 1, at step 200. The sending party preferably provides the username and password information using a login form, not shown, to registration and authentication module 122 in web server 180 as shown by way of example in FIG. 1. Registration and authentication module 122 communicates with data store 198 to retrieve the username and password information that was provided during registration, shown by way of example in FIG. 5 and authenticates the sending party.

After successfully logging in, at step 202, the sending party posts the content to be posted on web site system 100 to potential subscribers. This involves providing a textual description of the content. As part of the content, the sending party may also upload files such as, but not limited to, pdf files, MS Word files, bitmaps, coupons, jpeg files, gifs etc. Web site system 100 preferably generates a sample content form 600, shown by way of example in FIG. 6, used to enter this content. At step 204, the sending party uses smart-tags to tag the content to be sent out on web site system 100. The smart-tags are used to provide additional descriptive information about the nature of the content in question, for example, without limitation, information about the semantic nature of content. Smart-tags are used to identify the categories and the category hierarchies to which the content belongs and also to associate additional attributes to the content. For example, without limitation, a business category of "restaurant" may be selected, and sub-categories of "Italian" for cuisine type and "Northern" for cuisine region may be designated. Additional system-defined smart-tags may be used to identify additional attributes of the content, for example, without limitation, "lunch buffet", "dinner", "discount", etc. If the content is for the sale of a product or service, smart-tags may also specify information such as, but not limited to, pricing, quantity available, sales tax, shipping charges, etc. The section of content form 600 used to capture the smart-tag information is shown by way of example in FIG. 6.

In step 206, the sending party uses scheduling smart-tags to indicate the delivery schedule of the content to be sent out on web site system 100. These scheduling smart-tags capture information about when web site system 100 can start making the content available to potential subscribers of the content. To specify the scheduling smart-tags for the content, the sending party clicks scheduling tags 618 on content form 600, shown by way of example in FIG. 6. After steps 204 and 206, the sending party may optionally choose to display information about matching subscriptions on content form 600. In step 208, the sending party submits the content for delivery to potential recipients on web site system 100.

Figure 3:
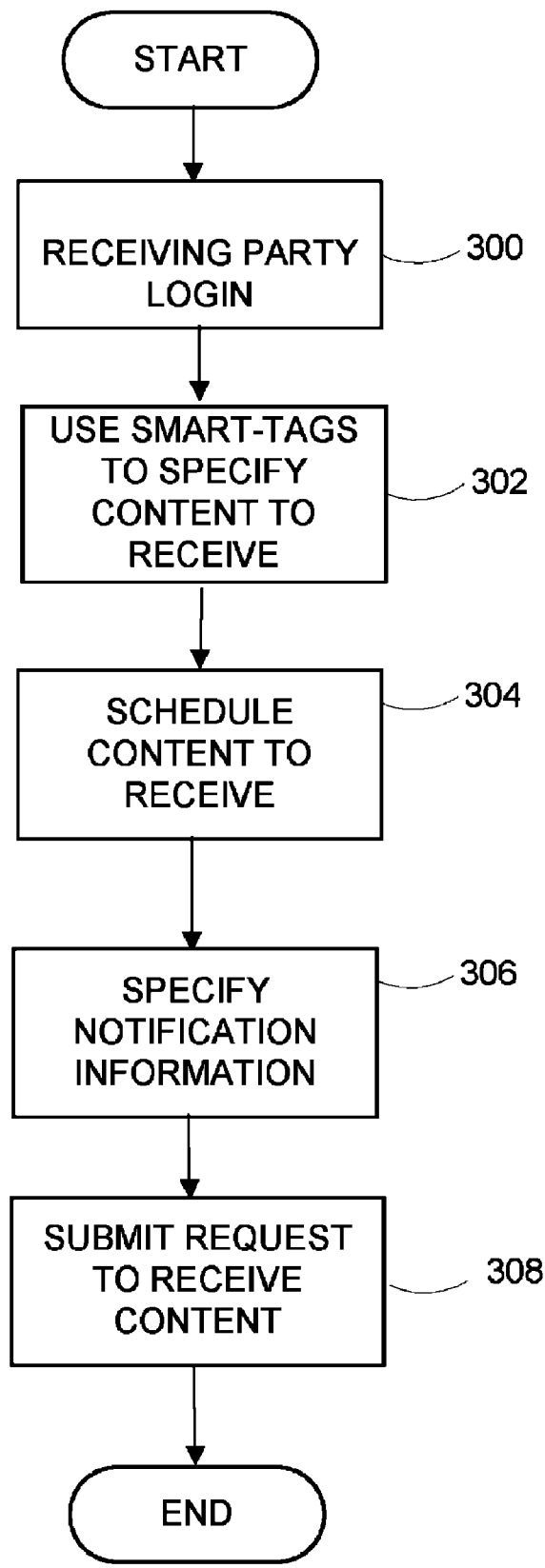
FIG. 3 is a flow chart illustrating an exemplary process of creation of a subscription request by a subscribing or receiving party, in accordance with an embodiment of the present invention.

FIG. 3 is a flow chart illustrating an exemplary process of creation of a subscription request by a subscribing or receiving party, in accordance with an embodiment of the present invention. The subscriber starts by initially logging in into web site system 100 at step 300. The subscriber preferably provides the username and password information using a login form, not shown, to registration and authentication module 122 in web server 180 as shown by way of example in FIG. 1. Registration and authentication module 122 communicates with data store 198 to retrieve the username and password information that was provided during registration, shown by way of example in FIG. 5, and authenticate the subscriber.

After successfully logging in, the user carries out step 302. At step 302, the subscriber user uses smart-tags to describe the content that the subscriber is interested in receiving. The smart-tags are used to provide additional descriptive information about the nature of the content in question, for example, without limitation, about the semantic nature of content. Smart-tags are used to identify the categories and the category hierarchies to which the content belongs and also to associate additional attributes to the content. A notification form 800 used to capture smart-tag information is shown by way of example in FIG. 8. At step 304, the subscriber specifies the system-defined scheduling smart-tags for scheduling the subscription of content. The user preferably provides a start date and an end date for receiving the content in content form 800. After steps 302 and 304, the subscriber may optionally choose to display information about matching content that might be available on web site system 100. In step 306, the subscriber specifies the notification preferences as to how he wishes to be notified when the requested content becomes available. The user has the option of getting notified through various methods such as, but not limited to, email and SMS. This preference can be specified in registration form 500 or notification form 800. In step 308, the subscriber submits the request for content to potential sending parties, if any, on web site system 100. It should be clarified that, as described in more detail below, posts and subscriptions can occur in any order and that matching content does not have to be available when subscription is created. Similarly, when a post is submitted, a matching subscription does not have to exist in the system. If the content being subscribed to refers to the sale of a product or service, some embodiments may enable the subscriber to authorize the system to automatically buy a certain number or units of the product or service when a sending party submits or posts a matching request for automatically selling the specific product or service.

In the present embodiment, the sending parties' requests for posting content and the scribers' subscription requests can be added to web site system 100 at any time. These requests are not required to be entered in any specific order.

Figure 4:
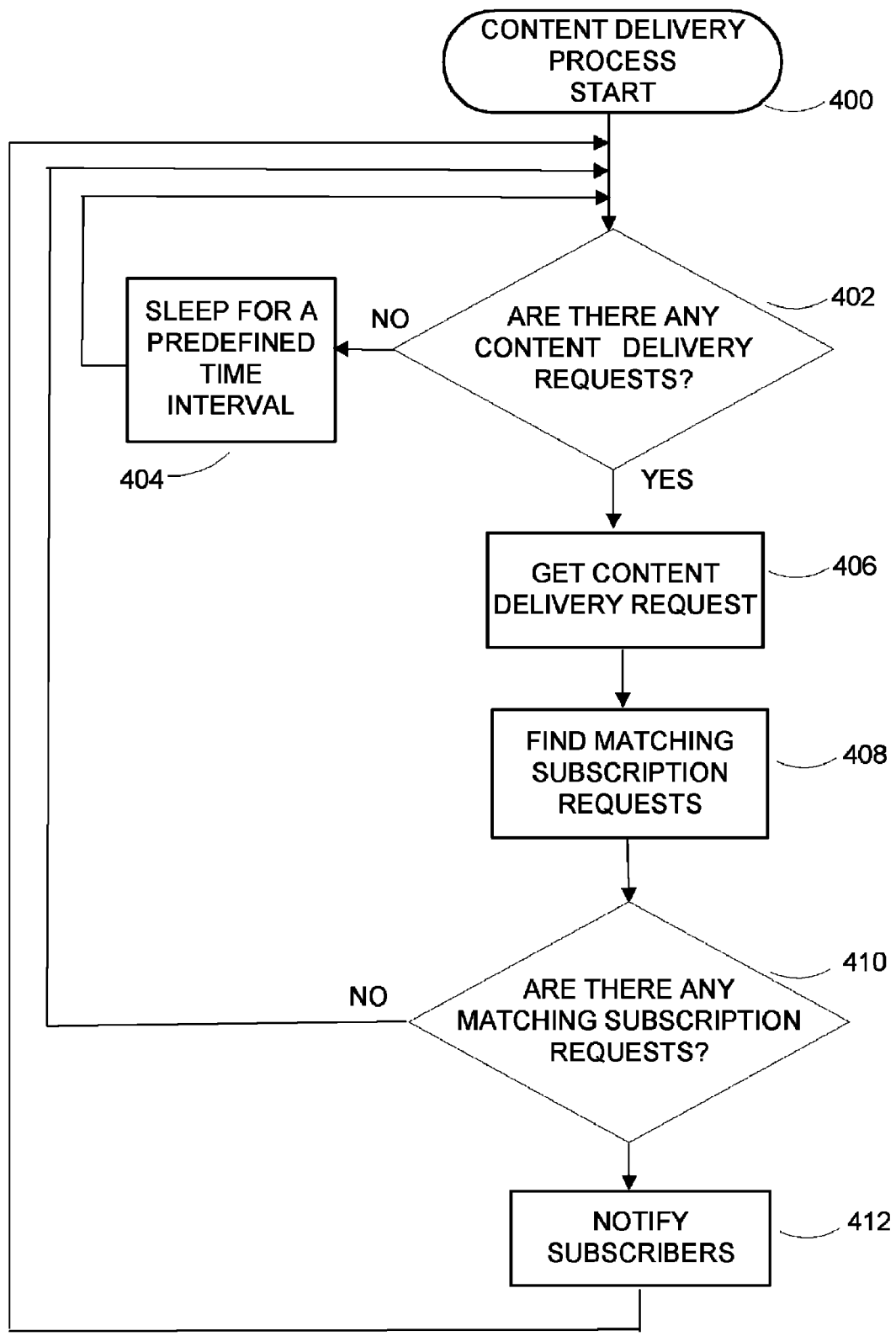
FIG. 4 is a flow chart illustrating an exemplary process of finding and delivering matching content to receiving parties, in accordance with an embodiment of the present invention.

FIG. 4 is a flow chart illustrating an exemplary process of finding and delivering matching content to receiving parties, in accordance with an embodiment of the present invention. Content delivery module 134, shown by way of example in FIG. 1, may periodically execute the content delivery process, beginning at step 400. In the present embodiment, the process is preferably initiated when web server 180, shown by way of example in FIG. 1, first starts up and preferably runs continuously.

In step 402, the content delivery process checks whether there are any content delivery requests in data store 198, shown by way of example in FIG. 1. If it is determined that there are no content delivery requests, the content delivery process puts itself to sleep in step 404 for a predefined interval of time. When the process wakes up, the process resumes execution at step 402. If, however, it is determined at step 402 that a content delivery request exists, the process during step 406 retrieves the content delivery request from data store 198.

At step 408, the process attempts to retrieve any subscription requests from data store 198 and attempts to match these subscription requests to the content delivery request received in step 406. As will be described, this matching is done by content delivery module 134. If at step 410 it is determined that there are no matching subscription requests, the content delivery process resumes execution at step 402. If, however, matching subscriptions are found at step 410, the process notifies the subscribers in step 412 using notification generation and delivery module 132, shown by way of example in FIG. 1. Notification generation and delivery module 132 generates a notification message by retrieving the content information, shown by way of example in post content to send section 690 of FIG. 6, and also the organizational information of the sending party if available, shown by way of example in organizational information section 506 of FIG. 5, from data store 198. This information is made available to all matching subscribers for viewing on web pages 120 accessed via client workstation 104, shown by way of example in FIG. 1. If a subscriber has opted to receive notifications via email, notification generation and delivery module 132 also emails this information to the subscriber at the email address specified in notification form 800, shown by way of example in FIG. 8. If a subscriber has opted to receive notifications via SMS, notification generation and delivery module 132 sends a short message to the subscriber at the SMS number specified in notification form 800, advising the subscriber about the availability of content. In alternate embodiments, subscribers may choose to be notified through various other methods such as, but not limited to, instant messages, faxes, pages, telephone calls, etc. At the completion of step 412 of the present embodiment, the content delivery process resumes execution at step 402.

FIG. 5 illustrates an exemplary screen shot of a registration form 500 used to enable sending parties and subscribers to register with web site system 100, in accordance with an embodiment of the present invention. In the present embodiment, the sending party and subscriber can create requests to send and/or receive desired content. Registration involves a subscriber or a sending party accessing web server 180 using an Internet browser on client workstation 104 or client workstation 106 and inputting the information requested in registration form 500 displayed as web page 120 on client workstation 104 or client workstation 106, as shown by way of example in FIG. 1. In reference to registration, the term user is used to describe either a subscriber or a sending party.

In the present embodiment, an account information section 502 has fields to capture account information such as, but not limited to, username, password, and email information from the user. The system enables the user to provide a fictitious username if desired to maintain anonymity. In a personal information section 504 of registration form 500, the user may optionally provide other personal information such as, but not limited to, first name, last name, address, and contact information. If the registration is being done on behalf of a commercial or a non-commercial organization or an individual owned business or operation of any kind, the user preferably provides organizational information in organizational information section 506 of registration form 500. The user preferably clicks a checkbox 510 to enable organizational information section 506 and then inputs the requested information. The organizational information preferably includes, without limitation, the organization name, contact information, a category in category field 512, and subcategories in subcategories field 514 associated with the organization. The user has the option to select a predefined category or type in a category in category field 512. When the user attempts to specify a subcategory in subcategory field 514, registration and authentication module 122 communicates with the smart-tag management module 124, shown by way of example in FIG. 1, and receives sub-categories associated with category specified in category field 512 and preferably uses these to limit the sub-categories available in subcategory field 514. For sub-categories, the user has the option to select a predefined sub-category or type in a sub-category in sub-category field 514. All of the registration information is preferably kept confidential and is not revealed to anyone without the permission of the user. The preferred embodiment provides subscriber anonymity. The sending party does not know who receives the content that he publishes because the sending party is not directing or addressing the content to a particular subscriber, but is instead posting the content on web site system 100 where the content may be received by any party who is interested in the particular content. In the preferred embodiment, the sending party's contact information is automatically included with the content being published. This information preferably includes, without limitation, the sending party's name and address. Some embodiments maintain the anonymity of all users. In these embodiments it is the responsibility of the sending party to include any pertinent contact information along with the content being published.

Depending on the embodiment of the present invention, subscribers and sending parties may be asked to provide additional information. For example, without limitation, in an embodiment that bills users, the registration form may also capture the user's billing information, such as, but not limited to, credit card information, a PayPal address, or other means for accepting payments online for potentially charging a fee. Some embodiments may enable the user to receive notifications through various means. These embodiments require the user to provide this contact information including, but not limited to, a fax number, a cell phone number for SMS, an instant messaging address, a pager number, a telephone number, etc.

When the user clicks on an enter hyperlink 508, the information specified in registration form 500 is transmitted from client workstation 104 or client workstation 106 to registration and authentication module 122 in web server 180 as shown by way of example in FIG. 1. If the user wishes to clear the information entered in registration form 500, the user may click a cancel hyperlink 516. Registration and authentication module 122 communicates the category and sub-category information from organizational information section 506 of registration form 500 to smart-tag and category management module 124 shown by way of example in FIG. 1. In return, registration and authentication module 122 then receives the smart-tag name-value pair for the category and subcategory from smart-tag and category management module 124. For example, without limitation, registration and authentication module 122 may receive "Business Type=Restaurant" as the category smart-tag name-value pair and "Dine-In Only=Yes" & "Cuisine Region=Northern Italian" as the subcategory smart-tags. Registration and authentication module 122 then stores the registration information along with the category and sub-category smart-tag name-value pairs in data store 198 as shown, by way of example, in FIG. 1.

FIG. 6 illustrates a screen shot of an exemplary content form 600 used by a sending party to post content, in accordance with an embodiment of the present invention. After successfully logging in to web site system 100, the sending party posts the content to be published on web site system 100 to potential subscribers. Web site system 100 generates content form 600 on which the sending party may enter this content. The content information is entered in a post content to send section 690. In the present embodiment, post content to send section 690 comprises a short subject line 604, a content description 606, and any disclaimers 608 if applicable. Disclaimers 608 may include, without limitation, restrictions on discounts such as, but not limited to, discount not valid in conjunction with any other discount or discount valid only at downtown location. As part of the content, the sending party may also upload one or more attachments files 610 containing any content such as, but not limited to, text, graphical images, audio, video data, or other digital content than can be delivered on the Internet.

The sending party also uses content form 600 to tag the content to be sent out onto web site system 100 with smart-tags. The smart-tags are used to provide additional descriptive information about the nature of the content in question. For example, without limitation, smart-tags are used to identify the categories and the category hierarchies to which the content belongs and also to associate additional attributes to the content. A tag content to send section 692 is used to capture the smart-tag information. This information preferably includes, without limitation, a category 612 and a subcategory 614. In the present embodiment, web site system 100 automatically limits sub-categories 614 available based on the value of category 612. The number of categories 612 and subcategories 614 in FIG. 6 are shown as an example only and not by way of limitation. In alternate embodiments, the sub-categories may have descendants that further have subcategories and thus be hierarchically nested to one or more levels.

To specify additional attributes for the content in the present embodiment, the sending party clicks additional attribute button 616 using a pointing device such as, but not limited to, a mouse and smart-tag and category management module 124, shown by way of example in FIG. 1, generates smart-tag editor form 702 shown by way of example in FIG. 7. The sender may then specify additional smart-tags for further describing the content. In the present embodiment, smart-tag and category management module 124 automatically limits the available smart-tags in smart-tag editor form 702 to those relevant to category 612 and subcategories 614. Based on category 612 and subcategories 614, smart-tag and category management module 124 also treats certain smart-tags as mandatory and thus requires the sending party to specify a value for these smart-tags. For example, without limitation, if the sending party is offering a discount on a product or service, smart-tag and category management module 124 may enforce that a value for a "Discount" smart-tag be specified. Usage of smart-tag editor form 702 is discussed in some detail in the description of FIG. 7 below. If the content being published is for a sale of a product or service, the sending party may also specify information such as, but not limited to, pricing, quantity available, sales tax, and shipping charges using appropriate smart-tags.

The sending party uses scheduling smart-tags to indicate the delivery schedule of the content to be published on web site system 100. These scheduling smart-tags capture information about when web site system 100 can start making the content available to potential subscribers of the content. To specify the scheduling smart-tags for the content, the sending party clicks a scheduling tags button 618 shown in tag content to send section 692 of content form 600 and smart-tag and category management module 124, shown by way of example in FIG. 1, generates a scheduling editor form 750 shown, by way of example, in FIG. 7. Usage of scheduling editor form 750 is discussed in detail in reference to FIG. 7.

In the present embodiment, the sending party may optionally choose to evaluate information about matching subscriptions. When the sending party clicks a refresh button 644 in a business intelligence section 694 of content form 600 is updated. Business intelligence section 694 communicates the smart-tag information that was cached from tag content to send section 692, including, but not limited to, category 612, subcategories 614, additional attributes, and scheduling tags to business intelligence module 128, shown by way of example in FIG. 1. Business intelligence module 128 interacts with content delivery module 134 to obtain information about matching subscription requests. This information is displayed in a number of subscription matches field 632, a potential number of SMS recipients field 635, and a potential number of email recipients field 636. In the present embodiment, web site system 100 displays only the counts of the matching subscription requests and no subscriber information. Business intelligence module 128 may preferably also include information about additional subscription requests in an extended matching descriptions field 638, an extended SMS recipients field 640, and an extended email recipients field 642. These extended fields enable the sending party to see how many subscription requests will be matched if the sending party broadens his content, for example, without limitation, if the percentage discount is increased, e.g., by way of example and not limitation, using additional attribute tags 616, or if one of the scheduling tags is modified. This information in the figure is shown as an example only and not by way of limitation. This information provides useful insight to the sending party on how to maximize the reach of their content. Sending parties can choose to revise the smart-tag information specified in tag content to send section 692. In an alternate embodiment, the information in business intelligence section 694 may be computed and shown in real-time without requiring the user to click on refresh button 644 as the smart-tags are being modified by the sending party in business intelligence section 692 or as subscription requests are received by web site system 100.

In the present embodiment when the sending party clicks an enter hyperlink 676, the information collected from post content to send section 690 and tag content to send section 692 of content form 600 is transmitted from client workstation 106 to content management module 126 in web server 180, shown by way of example in FIG. 1. Content management module 126 then translates this information into a format appropriate for data store 198, and saves this translated information to data store 198. In an alternate embodiment, content management module 126, in addition, may communicate with billing module 138 to charge the sending party a small fee using the sending party's billing information provided during registration if that information has been collected. After the sending party submits the content information, the sending party is able to view information concerning the content posted at any time. This information includes, without limitation, the count of currently matching subscriptions on web site system 100, the count of subscribers who were notified via email, SMS or other means, and the number of subscribers who have read the posted content on web sites 120. The sending party also may be notified when the number of subscriptions that match their content reaches a pre-specified value. This notification is sent via the notification preferences indicated by the sending party at registration.

FIG. 7 illustrates an exemplary screen shot of a smart-tag editor 702 and a scheduling editor 750 used by web site system 100, in accordance with an embodiment of the present invention. In the present embodiment, smart-tag editor 702 comprises three subparts identified as system-defined tags 704, available custom tags 708, and add custom tags 710. Smart-tag editor 702 comprises two columns, a tag name column 724 and a tag value column 726, common to all of the subparts, system-defined tags 704, available custom tags 708, and add custom tags 710.

Each subpart contains one or more rows viewable by dragging scrollbars, for example, without limitation, a scrollbar 706 by using a pointing device such as, but not limited to, a mouse or touchpad. In some embodiments, drop-down lists may be used instead of scrollbars. To use a system-defined tag 704 in the present embodiment, the sending party may, for example, without limitation, select a checkbox 712 in tag name column 724 and select an appropriate value 714 in the same row in value column 726. To use an available custom tag 708, the sending party may, for example, without limitation, select a checkbox 730 under tag name column 724 and then type an appropriate value 732 in the same row under value column 726. To add a custom tag 710, the sending party may, for example, without limitation, click in a text box 716 with cursor 720 using a pointing device such as, but not limited to, a mouse to type in the desired tag name and then click in a text box 722 using cursor 720 to type in the desired tag value. As a side effect of clicking in text box 722, the editor automatically adds a new blank row 718 to accept additional custom tag values. Smart-tag editor 702 may also enable users to type in values in a textbox, for example, without limitation, textbox 728 or select values using a drop-down list under tag value column 726 in the subparts, system-defined tags 704, available custom tags 708, and add custom tags 710. When the sending party clicks on an enter hyperlink 748, the information provided is cached in the computer's internal memory 1006, shown by way of example in FIG. 10 and smart-tag editor form 702 is removed from the screen. The sending party may click a cancel hyperlink 746 to clear the information from smart-tag editor 702.

Smart-tags are used by the sending party and subscribers to provide additional descriptive and qualifying information about the content being sent or received, for example, without limitation, information about the semantic nature of content, what the content is really about. Smart-tags are used to identify the categories and the subcategories into which the published content or requested content belongs and also to associate additional relevant attributes to that content. For example, without limitation, smart-tags may be used to associate an advertisement to the "Restaurant" category, and additional smart-tags may be used to identify one or more attributes of the content, for example, without limitation, if the advertisement is about "Lunch buffet" or "Dinner", the "discount" offered, "Validity" of the promotion, etc. In the present embodiment, web site system 100 maintains the smart-tags separately from the associated content. Each smart-tag comprises a name-value pair. The tag name or value may comprise one or more words or a sentence fragment. Tag names or values can comprise characters such as, but not limited to, letters, numbers, punctuations and special characters. Examples of smart-tag pairs are, without limitation, "Business Type=Restaurant", "Cuisine Type=Italian.", "Price=$5" or "Price=less than $5". To qualify and describe the content, the sending party or subscriber can choose one or more pre-defined smart-tag names such as, but not limited to, "state", "city" and "cuisine type", and assign them specific values. In the present embodiment, web site system 100 also enables sending parties or subscribers to define custom smart-tags at any time, for example, without limitation, "MyNeighborhood" or "My Park". A smart-tag pair is considered to match another smart-tag pair if the name parts and value parts of the two tag pairs match respectively. Furthermore, the value parts of the two tag pairs may also be considered a match if they match semantically. For example, and without limitation, smart-tag "Price=$5" may be considered to match smart-tag "Price=less than $5". It should be noted that in the present embodiment, custom tags are matched the same way as system tags. Public custom tags are accessible and usable by all users of the system. In another embodiment, the system may include a tag semantics module to determine whether custom tags are semantically or otherwise similar enough to other custom or system tags.

In the present embodiment, creating a custom tag involves specifying an appropriate tag name and assigning a value to this tag name. The creator of a custom tag has the option of marking the custom tag as private. If the custom tag is marked private, only the creator of that custom tag can access the tag. [It should be noted that in the present embodiment private tags can be later marked public for visibility and use by all users in the system. Private tags are like private data until made public. That is, creators of custom tags can freely change the tag type between private and public (or vice-versa) at any time. Otherwise, the custom tag is considered public and is accessible and useable by all users of web site system 100. To enhance reusability when a party is creating a custom tag in the present embodiment, web site system 100 offers suggestions about existing smart-tags in web site system 100 that may potentially match the custom tag being created.

The screen shot shown by way of example in FIG. 7 also includes scheduling editor 750. Scheduling editor 750 enables sending parties to specify scheduling parameters for sending and receiving content. The sending party preferably specifies a start date 760, an end date 762, and a delivery start date 764 to describe the scheduling window. In addition, different scheduling parameters can be specified for different days of the week. The sending party may use a pointing device such as, but not limited to, a mouse to click on checkboxes 754 to select the days of the week the smart-tag is valid, for example, without limitation, Monday through Friday. The sending party can then add start and end time information 756 and a delivery time in start delivering fields 758 for each of the days selected. If additional delivery information is specified, the information specified in start delivering fields 758 override the information specified by delivery start date 764. The scheduling information may be immediate or may be a date or time in the future, and web site system 100 does not deliver content to subscribers beyond end date 762. In some embodiments, additional granularity may be specified such as, but not limited to, recurring weekly, monthly intervals, and specific time ranges on specific days. In the present embodiment when the user clicks on an enter hyperlink 752, the information provided is cached in the computer's internal memory 1006, shown by way of example in FIG. 10 and scheduling editor 750 is removed from the screen. The sending party may click a cancel hyperlink 766 to clear the information from scheduling editor 750.

FIG. 8 illustrates a screen shot of an exemplary notification form 800 used by a subscriber to specify content the subscriber is interested in receiving, in accordance with an embodiment of the present invention. In the present embodiment, a describe content to receive section 810 of notification form 800 is used to capture smart-tag information. This information preferably comprises a category smart-tag 812 and a subcategory smart-tag 814 associated with the content. Web site system 100 automatically limits the sub-category smart-tags 814 available based on the value of category smart-tag 812.

To specify additional attributes of the content to receive, the subscriber clicks an additional attributes button 816 using a pointing device such as, but not limited to, a mouse and smart-tag and category management module 124, shown by way of example in FIG. 1, generates smart-tag editor form 702 shown by way of example in FIG. 7. The subscriber may then specify appropriate smart-tags describing the content. Usage of smart-tag-editor form 702 is discussed in reference to FIG. 7 and enables the subscriber to assign system-defined smart-tags or custom smart-tags to his subscription request in the same manner in which a sending party assigns smart-tags to the content being posted on web site system 100. In an alternate embodiment, if the content being subscribed to is for a sale of a product or service, the subscriber may preferably also specify information such as, but not limited to, pricing and quantity desired using appropriate smart-tags.

In the present embodiment, the subscriber also uses notification form 800 to specify the system defined scheduling smart-tags for scheduling the subscription for content. The user preferably provides a start date 832 and an end date 834 in a schedule content to receive section 830. These tags capture information about windows of time during which the subscriber wishes to receive partially or exactly matching content marked for delivery as it becomes available in web site system 100. In an alternate embodiment of the present invention, additional scheduling granularity may be specified in schedule content section 830 such as, but not limited to, specific time ranges on specific days of the week, and recurring weekly or monthly intervals.

The subscriber may optionally choose to display information about matching content that might be available on web site system 100. When the subscriber clicks a refresh button 856 in a business intelligence section 850 of notification form 800, the smart-tag information, such as, but not limited to, category smart-tag 812, subcategory smart-tags 814, additional attributes, start date 832 and end date 834 is communicated to business intelligence module 128, shown by way of example in FIG. 1. Business intelligence module 128 interacts with content delivery module 134 to obtain information about matching content. This information is displayed in a currently matching content field 852, which displays the amount of content available that exactly matches the subscription request. Business intelligence module 128 may also include, without limitation, information about additional content in extended matching content field 854, which displays the amount of content available that will match the subscription request if some of the subscription parameters are changed or broadened, for example, without limitation, if the percentage discount is decreased or a scheduling tag is modified. This information is shown in the figure as an example only and not by way of limitation. The information in extending matching content field 854 provides useful insight to the subscriber on how to increase the scope of their subscription request to get the maximum amount of relevant content. In an alternate embodiment, the information in business intelligence section 850 may be computed and shown in real-time without requiring the subscriber to click on refresh button 856 as the smart-tags are being modified by the subscriber in describe content to receive section 810 and schedule content to receive section 830 and as content becomes available for delivery from sending parties.

In the present embodiment, the subscriber specifies the notification preferences as to how he wishes to be notified when the requested content becomes available. The subscriber has the option of receiving notification via various means such as, but not limited to, email or SMS. This information is specified in notification preferences section 870 of notification form 800. Web site system 100 automatically fills in a notification email field 872 and an SMS notification number field 874 based on the email and SMS notification information provided in personal information section 504 of registration form 500, shown by way of example in FIG. 5, during the registration process. The subscriber has the option of overriding this information by inputting new values in notification email field 872 and SMS notification number field 874. In alternate embodiments, the subscriber may be able to request notification through various other means such as, but not limited to, fax, instant message or page.

When the subscriber clicks on an enter hyperlink 876 in the present embodiment, the information collected from describe content to receive section 810, schedule content to receive section 830, business intelligence section 850, and notification preferences section 870 of notification form 800 is transmitted from client workstation 104 to subscription management module 130 in web server 180, shown by way of example in FIG. 1. Subscription management module 130 then translates this information into a format appropriate for data store 198, and saves this translated information to data store 198.

Matching Content to be Sent with Subscription Requests

When content matching a subscription request becomes available for delivery, web site system 100 delivers the content to the appropriate subscribers for consumption such as, but not limited to, reading, viewing, playing, etc. on the portal. Web site system 100 notifies the subscriber using the notification channels indicated by the subscriber, for example, without limitation, email, SMS, instant message, fax, page, etc. The content delivery process, shown by way of example in FIG. 4, uses content delivery module 134, shown by way of example in FIG. 1, to match a content delivery request with qualifying subscription requests. Content delivery module 134 uses a multi-step process to find subscription requests that match the content delivery request. In the present embodiment, content delivery module 134 continuously monitors the content being published and the content being requested by the subscribers for matches based on the qualifying information in the smart-tags. A smart-tag pair is considered to match another smart-tag pair if the name parts and value parts of the two pairs match.

Figure 9:
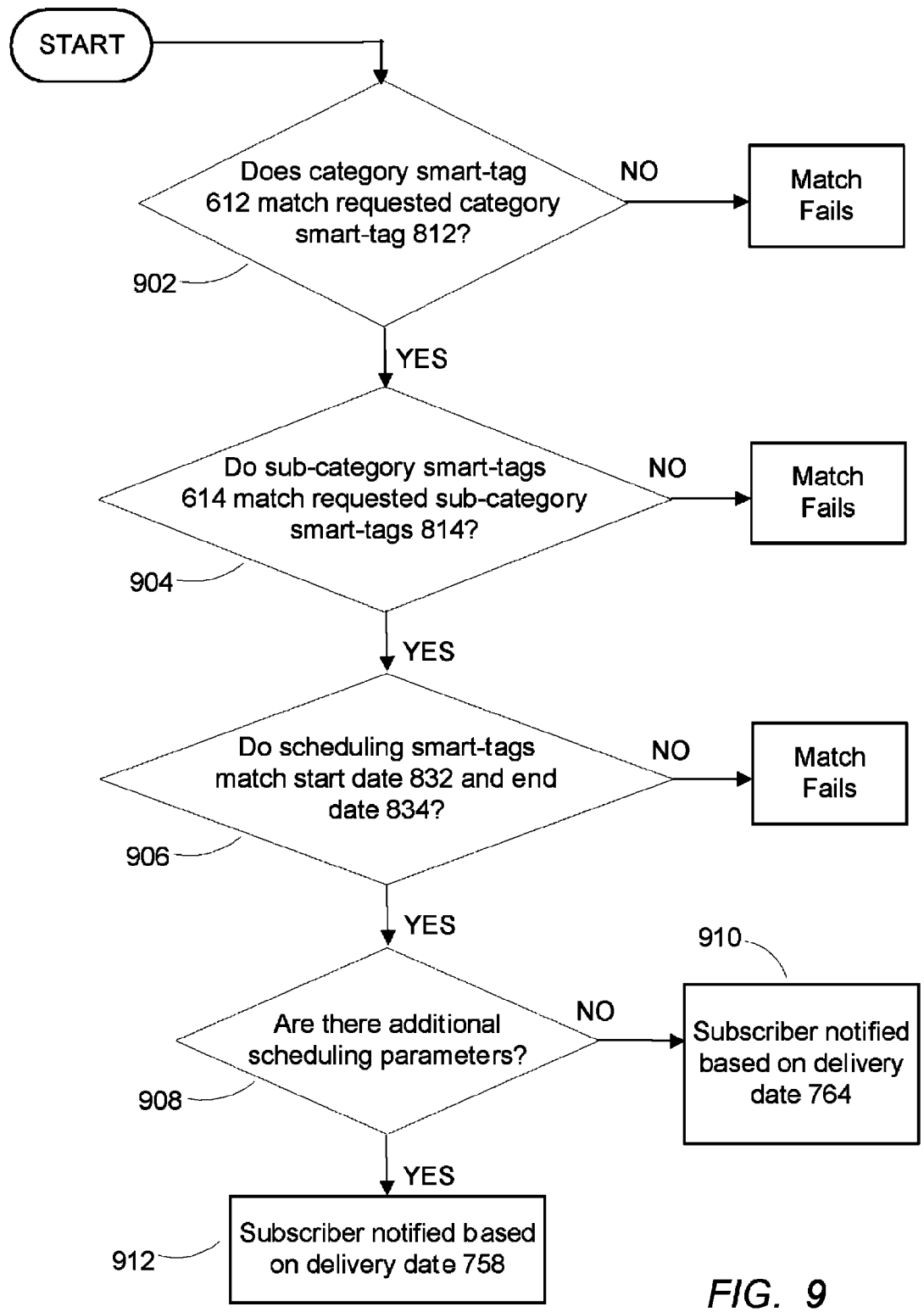
FIG. 9 is a flow chart illustrating an exemplary process for matching content delivery requests with subscription requests, in accordance with an embodiment of the present invention.

FIG. 9 is a flow chart illustrating an exemplary process for matching content delivery requests with subscription requests, in accordance with an embodiment of the present invention. In step 902 content delivery module 134 first attempts to match category smart-tag 612, shown by way of example in FIG. 6, specified in the content delivery request with requested category smart-tag 812, shown by way of example in FIG. 8, specified in the subscription request. If category smart-tag 612 does not match requested category smart-tag 812, the match between the content delivery request and the subscription request is considered to have failed.

If category smart-tag 612 matches requested category smart-tag 812, the process advances to step 904 where content delivery module 134 attempts to match subcategory smart-tags 614, shown by way of example in FIG. 6, specified in the content delivery request with requested subcategory smart-tags 814, shown by way of example in FIG. 8, specified in the subscription request. If subcategory smart-tags 614 do not match requested subcategory smart-tags 814, the match between the content delivery request and the subscription request is considered to have failed.

In step 904, if subcategory smart-tags 614 match requested subcategory smart-tags 814, the content delivery module 134 then attempts to match the attribute smart-tags specified in the content delivery request with the requested attribute smart-tags specified in the subscription request. If the attribute smart-tags do not match the requested attribute smart-tags, the match between the content delivery request and the subscription request is considered to have failed. Otherwise the match is considered a success and the process proceeds to step 906. In step 906 content delivery module 134 then attempts to match the scheduling smart tags specified in content delivery request with the scheduling smart tags, start date 832 and end date 834 shown by way of example in FIG. 8, specified for the subscription request. If start date 832 and end date 834 fall within start date 760 and end date 762, shown by way of example in FIG. 7, specified via the scheduling tags, the process continues to step 908. In step 908 it is determined if there are additional scheduling parameters, such as, but not limited to, valid dates and valid times. If there are no additional scheduling parameters, the subscriber for the subscription request is notified based on delivery date 764 in step 910. If additional scheduling parameters are specified, delivery time 758 is used to notify the subscriber instead of delivery date 764 in step 912 because delivery time 758 takes into consideration these additional scheduling parameters.

This is a simplistic match scenario. As would be apparent to a person of ordinary skill in the art, in some embodiments content delivery module 134 may make content delivery and notification decisions based on partial matches between subcategories and partial matches between attribute tags of the content to be delivered and the subscription request. For example, without limitation, category smart-tag 612 specified in the content delivery request matches requested category smart-tag 812 specified in the subscription request as both are specified to the value "Restaurant." Further, subcategory smart-tags 614 in the content delivery request are set to specific values; however, no value has been specified for requested subcategory smart-tags 814 for the subscription request. In this case, the subscription request is less specific compared to the content delivery request and content delivery module 134 may proceed to match the attribute smart-tags. The attribute tags may be matched exactly or partially as well. In some embodiments there may be an option for subscribers to enable or disable partial matches. A subscriber may wish to disable partial matches if he only wishes to receive very specific content.

Database

In the present embodiment, data store 198, shown by way of example FIG. 1, is a relational database and comprises numerous tables. Data store 198 comprises a subscriber account table comprising information shown in registration form 500, shown by way of example in FIG. 5. Information in the subscriber account table includes, without limitation, user name, user password, and email address, first name, last name, address, city, state, zip code, country, notification email, and SMS notification number, organization name, website address, category, subcategories, address, city, state, zip code, country, phone number, and fax number. When a subscriber registers with web site system 100, registration and authentication module 122, shown by way of example in FIG. 1, stores the subscriber registration information in the subscriber account table. Also, when a subscriber logs in into web site system 100, registration and authentication module 122 uses the subscriber account table to authenticate the user.

Data store 198 also comprises a content delivery request table comprising information shown in content form 600, shown by way of example in FIG. 6 and smart-tag information in smart-tag editor 702 and scheduling editor from 750, shown by way of example in FIG. 7. Information in the content delivery request table includes, without limitation, subject, description, disclaimer, attachments, category, subcategories, one or more smart-tags representing content attributes, scheduling tag information, start date, end date, start delivery date, and validity and delivery dates for one or more days of the week. When a sending party creates a request for content delivery, content management module 126, shown by way of example in FIG. 1, stores this information in the content delivery request table.

Data store 198 also comprises a subscription request table comprising information shown in smart-tag editor 702, shown by way of example in FIG. 7 and describe content to receive section 810, business intelligence section 850 and notification preferences section 870 of notification form 800 shown by way of example in FIG. 8. Information in subscription request table includes without limitation, subcategories, one or more smart-tags representing content attributes, start date, end date, notification email, and SMS notification number. When a subscriber creates a request for receiving content, subscription management module 130, shown by way of example in FIG. 1, stores this information in the subscription request table.

Data store 198 also comprises a smart tag table comprising information in smart-tag editor 702, shown by way of example in FIG. 7, such as, but not limited to, the name-value pairs for system-defined tags and name-value pairs for custom tags defined by sending parties. The smart-tag table also comprises information about categories and their related subcategories.

Data store 198 may also comprise a billing information table comprising information such as, but not limited to, the sending party's credit card number, credit card bank, and billing address. Billing module 138 uses the billing information table to charge users for any fee based services provided by web site system 100.

Administration

In the present embodiment, web site system 100 comprises one or more administrative tools to be used for administering web server 180 and modules contained therein from one or more web site owner client workstations 108. The functionality of the administrative tools is used for actions such as, creating administrative accounts, loading categories, loading subcategories, and loading smart-tag data into web server 180, bootstrapping and administering web server 180, and maintaining other configuration information as required by the technology choices made to implement web server 180.

Although the present invention has been illustrated in a restaurant environment, web site system 100 may be utilized to send and receive content about any domain, as would be apparent to a person of ordinary skill in the art such as, but not limited to, retail stores, service providers, etc. In the description sending parties and subscribers have been referred to separately. However, in some cases a sending party may wish to make subscription requests as well as publish content in web site system 100. Also, in some cases the subscribing party may wish to publish content as well as make subscription requests in web site system 100.

In an alternate embodiment of the present invention, registered or unregistered users of the system may search and browse the content that is available in the system. The users provide search criteria such as, but not limited to, a keyword, a phrase or a sentence to search the content. Users may also provide geographic data such as, but not limited to, a city or zip code to constrain the search criteria. Users may further qualify the search criteria by using one or more existing smart-tags in the system and specifying appropriate values for those smart-tags.

Those skilled in the art, in light of the present teachings, will recognize that the screen shots shown in the figures are exemplary and may have various different layouts and comprise different information depending on the particular embodiment. For example, without limitation, the personal information required on the registration form may be different or the scheduling editor may be displayed as a calendar where the user may click on the desired start and end date and indicate valid times on the corresponding valid dates on the calendar.

Figure 10:
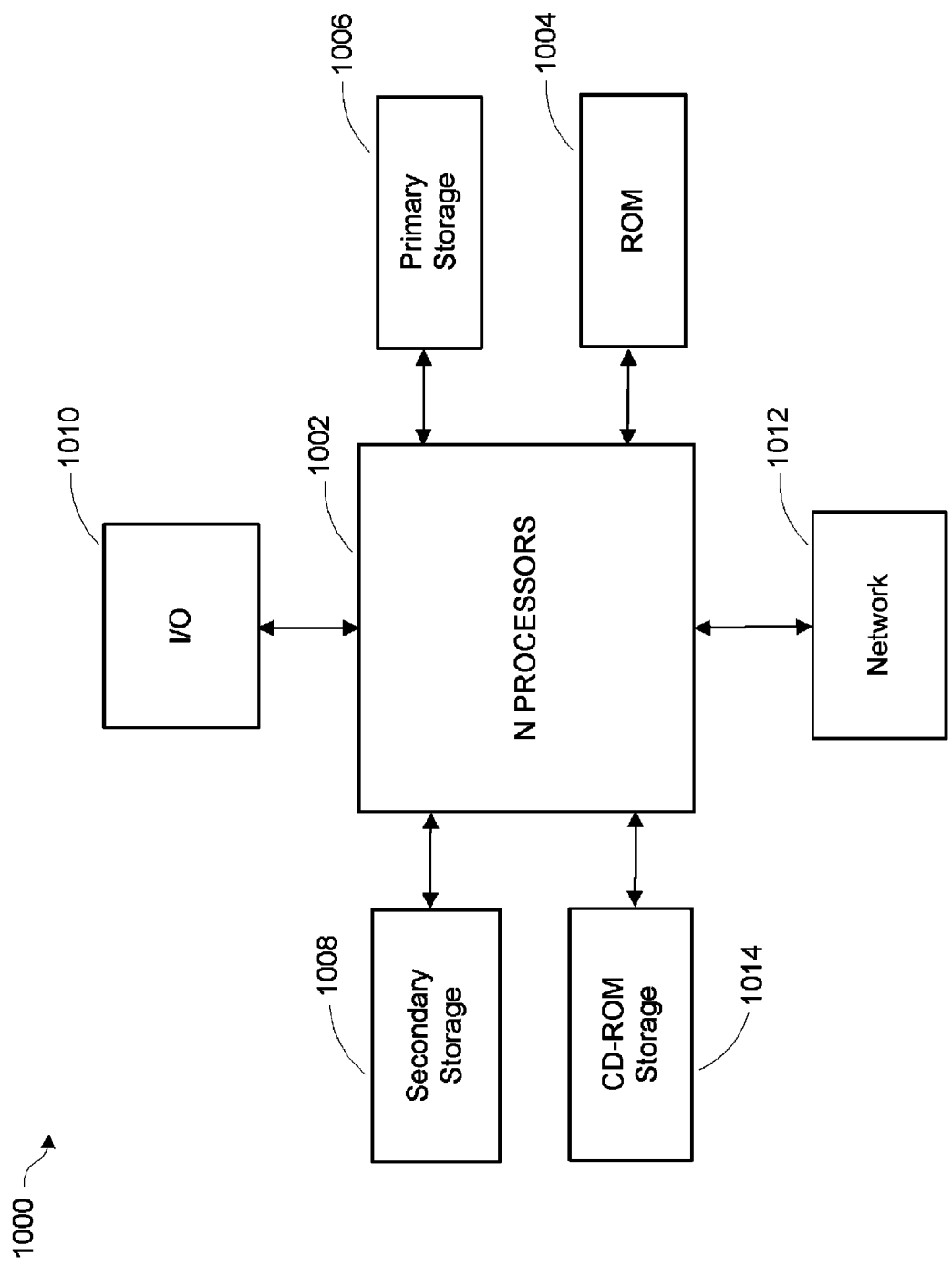
FIG. 10 illustrates a typical computer system that, when appropriately configured or designed, can serve as a computer system in which the invention may be embodied.

FIG. 10 illustrates a typical computer system that, when appropriately configured or designed, can serve as a computer system in which the invention may be embodied. The computer system 1000 includes any number of processors 1002 (also referred to as central processing units, or CPUs) that are coupled to storage devices including primary storage 1006 (typically a random access memory, or RAM), primary storage 1004 (typically a read only memory, or ROM). CPU 1002 may be of various types including microcontrollers (e.g., with embedded RAM/ROM) and microprocessors such as programmable devices (e.g., RISC or SISC based, or CPLDs and FPGAs) and unprogrammable devices such as gate array ASICs or general purpose microprocessors. As is well known in the art, primary storage 1004 acts to transfer data and instructions uni-directionally to the CPU and primary storage 1006 is used typically to transfer data and instructions in a bi-directional manner. Both of these primary storage devices may include any suitable non-transitory computer-readable media such as those described above. A mass storage device 1008 may also be coupled bi-directionally to CPU 1002 and provides additional data storage capacity and may include any of the non-transitory computer-readable media described above. Mass storage device 1008 may be used to store programs, data and the like and is typically a secondary storage medium such as a hard disk. It will be appreciated that the information retained within the mass storage device 1008, may, in appropriate cases, be incorporated in standard fashion as part of primary storage 1006 as virtual memory. A specific mass storage device such as a CD-ROM 1014 may also pass data uni-directionally to the CPU.

CPU 1002 may also be coupled to an interface 1010 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1002 optionally may be coupled to an external device such as a database or a computer or telecommunications or internet network using an external connection as shown generally at 1012, which may be implemented as a hardwired or wireless communications link using suitable conventional technologies. With such a connection, it is contemplated that the CPU might receive information from the network, or might output information to the network in the course of performing the method steps described in the teachings of the present invention.

Those skilled in the art will readily recognize, in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing novel means for and/or steps described that the applications designer will selectively decide, depending upon the practical considerations of the particular implementation, to carry out and/or locate within the jurisdiction of the USA. For any claims construction of the following claims that are construed under 35 USC §112 (6) it is intended that the corresponding means for and/or steps for carrying out the claimed function also include those embodiments, and equivalents, as contemplated above that implement at least some novel aspects and objects of the present invention in the jurisdiction of the USA.

Having fully described at least one embodiment of the present invention, other equivalent or alternative means for implementing a web based communications system using smart-tags according to the present invention will be apparent to those skilled in the art. For example, without limitation, the above system is described as continuously monitoring for matches in posted content and subscription requests. However, some embodiments may periodically check for matches and then enter a sleep mode for a predetermined period of time. In some embodiments, the system may communicate with third party systems using technologies such as, but not limited to, web services, to receive content. The system may analyze the content obtained from these third party systems in order to fulfill subscription requests. In yet another embodiment, the system may crawl the world wide web to obtain content from other web sites in order to fulfill a subscription request. In some embodiments instead of on the Internet, the system may operate on a smaller network such as, but not limited to a local area network (LAN). For example, without limitation, a large shopping center may have a network supporting a system in which retailers can post content such as, but not limited to, sales or special offers. Shoppers may then access the system through means such as, but not limited to, computers set up in the shopping center to make subscription requests to receive information about products and sales available in the shopping center. The invention has been described above by way of illustration, and the specific embodiments disclosed are not intended to limit the invention to the particular forms disclosed. The invention is thus to cover all modifications, equivalents, and alternatives falling within the spirit and scope of the following claims.

Claim elements and steps herein may have been numbered and/or lettered solely as an aid in readability and understanding. As such, the numbering and lettering in itself is not intended to and should not be taken to indicate the ordering of elements and/or steps in the claims.

What is claimed is:

1. A method for delivering content to users from a web site system over a network, the method comprising the steps of:
   a plurality of users connecting to the web site system over the network, where at least one of said plurality of users registering as a sending party providing content to the web site system along with one or more smart-tags associated with the content for non-transitory storage of the content and said smart tags on the web site system, said smart-tags providing qualifying information about the content, and where at least one of said plurality of users registering as a subscribing party to request content non-transitorily stored on the web site system by providing a subscription comprising one or more smart-tags, said smart-tags providing qualifying information about desired content to be received;
   said sending party submitting the content and said one or more smart-tags to the web site system for non-transitory storage;
   said sending party receiving first business intelligence information comprising a number of an amount of subscriptions matching said one or more smart-tags submitted by said sending party, and one or more alternative smart-tags with a potential number of an amount of subscriptions matching said alternative smart-tags, where said sending party can choose a one of said one or more alternative smart-tag for submission with the content;
   said sending party reviewing said first business intelligence information, finalizing said submission of smart-tags and requesting the web site system to deliver the content submitted by said sending party;
   said subscribing party submitting said subscription;
   said subscribing party receiving subscriber business intelligence information comprising a number of an amount of content, non-transitorily stored on the web site system, matching said subscription, and one or more alternative smart-tags and a potential number of an amount of content matching said alternative smart-tags, where said subscribing party can choose a one of said one or more alternative smart-tag for submission with said subscription;
   said subscribing party reviewing said subscriber business intelligence information, finalizing said submission of said subscription and requesting delivery of said desired content; and
   said subscribing party receiving said desired content, from said non-transitory storage of the web site system over the network, when said subscription at least in part matches one or more smart-tags submitted by said sending party.

2. The method as recited in claim 1, further comprising the step of said plurality of users providing said qualifying information for identifying categories and category hierarchy to which the content belongs.

3. The method as recited in claim 2, further comprising the step of said plurality of users submitting said smart-tags by selecting a predefined tag name and assigning said predefined tag name a value further defining said predefined tag name.

4. The method as recited in claim 3, further comprising the step of said one or more users submitting said smart-tags by creating a custom tag name and assigning said custom tag name a value further defining said custom tag name.

5. The method as recited in claim 1, further comprising the step of after said sending party requests the web site system to deliver content, said sending party receiving second business intelligence information, from the web site system, comprising a number of an amount of matched subscriptions to said one or more smart-tags submitted by said sending party and a number of an amount of subscribing parties that have received desired content submitted by said sending party.

6. The method as recited in claim 1, further comprising the step of said sending party providing account information for the purpose of restricting access to modify content, smart-tags and other information provided by said sending party.

7. The method as recited in claim 1, further comprising the step of said sending party providing billing information for the purpose of receiving billing for services provided by the web site system.

8. The method as recited in claim 1, further comprising the step of said sending party providing notification information for the purpose of receiving notifications from the web site system.

9. The method as recited in claim 8, further comprising the step of said sending party requesting notification of said number of matched subscriptions reaching a determined value and said sending party receiving said notification.

10. The method as recited in claim 1, further comprising the step of said sending party providing time period information for the purpose of determining when content provided by said sending party can be received by said subscribing party from the web site system.

11. The method as recited in claim 10, further comprising the step of said subscribing party providing time period information for the purpose of determining when desired content can be received by said subscribing party.

12. The method as recited in claim 1, further comprising the step of said subscribing party providing account information for the purpose of restricting access to modify smart-tags and other information provided by said subscribing party.

13. The method as recited in claim 1, further comprising the step of said subscribing party providing billing information for the purpose of receiving billing for services provided by the web site system.

14. The method as recited in claim 1, further comprising the step of said subscribing party providing notification information for the purpose of receiving notifications from the web site system.

15. The method as recited in claim 14, further comprising the step of said subscribing party receiving notification from the web site system when desired content is available for delivery.

16. The method as recited in claim 15, wherein when said sending party receives said second business intelligence information from the web site system, said second business intelligence information further comprises a number of notifications, of sender's content being available for delivery, that are delivered to subscribing parties.

17. The method as recited in claim 1, further comprising steps for purchasing an item or service when desired content is for a sale of said item or service.

18. The method as recited in claim 1, wherein one or more users browse content on the web site system using search criteria.

19. The method as recited in claim 18, wherein one or more users browse content on the web site system using an existing smart-tag to qualify said search criteria.

20. A method for delivering content to users from a web site system over a network, the method comprising:
    steps for plurality of users to connect to the web site system over the network where at least one of said plurality of users registers as a sending party and where at least one of said plurality of users registers as a subscribing party;
    steps for said sending party to submit content to the web site system and one or more smart-tags associated with the content for non-transitory storage of the content and said one or more smart-tags on the web site system;
    steps for said subscribing party to request desired content from the web site system by submitting a subscription comprising one or more smart-tags;
    steps for said sending party receiving first business intelligence information comprising a number of an amount of subscriptions matching said one or more smart-tags submitted by said sending party, and one or more alternative smart-tags with a potential number of an amount of subscriptions matching said alternative smart-tags, where said sending party can choose a one of said one or more alternative smart-tag for submission with the content;
    steps for said sending party to review said first business intelligence information, finalize said submission of smart-tags and request the web site system to deliver content;
    steps for said subscribing party to receive subscriber business intelligence information comprising a number of an amount of content, non-transitorily stored on the web site system, matching said subscription, and one or more alternative smart-tags and a potential number of an amount of content matching said alternative smart-tags, where said subscribing party can choose a one of said one or more alternative smart-tag for submission with said subscription;
    steps for said subscribing party to review said subscriber business intelligence information, finalize said submission of said subscription and request delivery of said desired content; and
    steps for said subscribing party to receive said desired content from said non-transitory storage of the web site system over the network.

21. The method as recited in claim 20, further comprising the step of after said sending party requests the web site system to deliver content, steps for said sending party receiving second business intelligence information from the web site system.

22. The method as recited in claim 20, further comprising steps for said sending party providing account information.

23. The method as recited in claim 22, further comprising steps for said sending party providing billing information.

24. The method as recited in claim 22, further comprising steps for said sending party providing notification information.

25. The method as recited in claim 24, further comprising steps for said sending party requesting notification of said number of matched subscriptions reaching a determined value.

26. The method as recited in claim 20, further comprising steps for said sending party providing time period information.

27. The method as recited in claim 26, further comprising steps for said subscribing party providing time period information.

28. The method as recited in claim 20, further comprising steps for said subscribing party providing account information.

29. The method as recited in claim 28, further comprising steps for said subscribing party providing billing information.

30. The method as recited in claim 29, further comprising steps for said subscribing party providing purchase information.

31. The method as recited in claim 28, further comprising steps for said subscribing party providing notification information.

32. The method as recited in claim 31, further comprising steps for said subscribing party receiving notification from the web site system when desired content is available for delivery.

33. The method as recited in claim 20, wherein steps for one or more users to browse content on the web site system using search criteria.

34. A system for delivering content to users from a web site system over a network, the system comprising:
    means for a plurality of users to connect to the web site system over the network where at least one of said plurality of users registers as a sending party and where at least one of said plurality of users registers as a subscribing party;
    means for said sending party to submit content to the web site system and one or more smart-tags associated with the content for non-transitory storage of the content and said one or more smart-tags on the web site system;
    means for said subscribing party to request desired content from the web site system by submitting a subscription comprising one or more smart-tags;
    means for said sending party to receive business intelligence information comprising a number of an amount of subscriptions matching said one or more smart-tags submitted by said sending party, and one or more alternative smart-tags with a potential number of an amount of subscriptions matching said alternative smart-tags, where said sending party can choose a one of said one or more alternative smart-tag for submission with the content;

means for said subscription party to receive subscriber business intelligence information comprising a number of an amount of content, non-transitorily stored on the web site system, matching said subscription, and one or more alternative smart-tags and a potential number of an amount of content matching said alternative smart-tags, where said subscribing party can choose a one of said one or more alternative smart-tag for submission with said subscription;

means for said sending party to review said business intelligence information, finalize said submission of smart-tags and request the web site system to deliver content;

means for said subscribing party to review said subscriber business intelligence information, finalize said submission of said subscription and request delivery of said desired content;

means for said sending party to receive notifications from the web site system;

means for said subscribing party to receive notifications from the web site system; and means for said subscribing party to receive said desired content from said non-transitory storage of the web site system over the network.

35. The method as recited in claim 34, further comprising means for said subscribing party to purchase goods or services from said sending party.

36. The method as recited in claim 34, wherein means for one or more users to browse content on the web site system.

37. A system for delivering content to users from a web site system over a network, the system comprising:

a presentation layer for receiving and sending information to users;

a registration and authentication module for registering and confirming identities of users of the system;

a content management module for managing creation, access, and updates of content delivery requests from users registered as sending parties requesting to send content;

a smart-tag management module handling functionality related to creating, updating, and accessing smart-tags associated with the content, said smart-tags comprising a tag name and a value assigned to said tag name where one or more smart-tags are associated to the content by said sending party;

a subscription management module managing creation, access, and updates of subscriptions from users registered as subscribing parties requesting to receive desired content, said subscriptions comprising one or more smart-tags;

a non-transitory data store for storing at least said content and said smart-tags;

a content delivery module using an algorithm for matching content to said subscriptions using said smart-tags;

a business intelligence module for providing information to said sending parties and said subscribing parties regarding matching subscriptions and for providing alternate smart-tags from which said sending parties and said subscribing parties can choose; and a notification generation and delivery module for delivering content from said non-transitory data store that matches subscriptions to the respective subscribing parties where content from said sending party is delivered and the web site system provides anonymity to said subscribing party.

38. The system as recited in claim 37, in which said notification generation and delivery module further comprises means for notifying subscribing parties of content matching said subscriptions.

39. The system as recited in claim 37, further comprising a billing module for billing sending parties or subscribing parties for services provided by the web site system.

40. The system as recited in claim 39, further comprising means for creating web pages for use by said presentation layer.

41. A computer program product for delivering content to users from a web site system over a network, the product comprising: a non-transitory computer-readable medium for storing the computer program product, which further comprises:

computer program code for a plurality of users to connect to the web site system over the network where at least one of said plurality of users registers as a sending party and where at least one of said plurality of users registers as a subscribing party;

computer program code for said sending party to submit content to the web site system and one or more smart-tags associated with the content for non-transitory storage of the content and said one or more smart-tags on the web site system;

computer program code for said subscribing party to request desired content from the web site system by submitting a subscription comprising one or more smart-tags;

computer program code for said sending party to receive a business intelligence information comprising a number of an amount of subscriptions matching said one or more smart-tags submitted by said sending party, and one or more alternative smart-tags with a potential number of an amount of subscriptions matching said alternative smart-tags, where said sending party can choose a one of said one or more alternative smart-tag for submission with the content;

computer program code for said subscribing party to receive a subscriber business intelligence information comprising a number of an amount of content, non-transitorily stored on the web site system, matching said subscription, and one or more alternative smart-tags and a potential number of an amount of content matching said alternative smart-tags, where said subscribing party can choose a one of said one or more alternative smart-tag for submission with said subscription;

computer program code for said sending party to review said business intelligence information, finalize said submission of smart-tags and request the web site system to deliver content;

computer program code for said subscribing party to review said subscriber business intelligence information, finalize said submission of said subscription and request delivery of said desired content;

computer program code for said sending party to receive notifications from the web site system;

computer program code for said subscribing party to receive notifications from the web site system;

computer program code for said subscribing party to receive said desired content from said non-transitory storage of the web site system over the network.

* * * * *